United States Patent [19]

Breitscheidel et al.

[11] Patent Number: 4,615,411

[45] Date of Patent: Oct. 7, 1986

[54] SOUND-INSULATED FLOW DUCT AND PROCESS FOR THE MANUFACTURE THEREOF

[75] Inventors: Hans-Ulrich Breitscheidel, Siegburg; Cosmas Lorry, Niederkassel; Helmut Rehlen, Härte 6, 7951 Ingoldingen; Jürgen Roellinghoff, Fohrenweg 9, 7950 Mettenburg, all of Fed. Rep. of Germany

[73] Assignees: Dynamit Nobel AG; Helmut Rehlen; Jürgen Roellinghoff, all of Troisdorf, Fed. Rep. of Germany

[21] Appl. No.: 497,576

[22] Filed: May 24, 1983

[30] Foreign Application Priority Data

May 27, 1982 [DE] Fed. Rep. of Germany ....... 3220023

[51] Int. Cl.⁴ .................. E04F 17/04; F01N 1/24
[52] U.S. Cl. .................... 181/224; 181/252; 181/286; 181/290; 181/291; 181/294
[58] Field of Search ............. 181/224, 225, 252, 256, 181/286, 290, 294, DIG. 1, 291; 428/71, 161, 316.6

[56] References Cited

U.S. PATENT DOCUMENTS

| | | | |
|---|---|---|---|
| 3,000,464 | 9/1961 | Watters | 181/224 |
| 3,196,975 | 7/1965 | Voelker | 181/290 |
| 3,582,095 | 6/1971 | Chalet du Dyck | 428/161 X |
| 3,741,844 | 6/1973 | Schwartz | 428/316.6 X |
| 3,954,537 | 5/1976 | Alfter et al. | 428/316.6 X |
| 4,236,597 | 12/1980 | Kiss et al. | 181/224 |
| 4,340,129 | 7/1982 | Salyers | 181/286 X |
| 4,432,580 | 2/1984 | Lohmar et al. | 181/290 X |
| 4,436,179 | 3/1984 | Yamamoto et al. | 181/286 X |

FOREIGN PATENT DOCUMENTS

| | | |
|---|---|---|
| 1861329 | 2/1962 | Fed. Rep. of Germany . |
| 1924734 | 11/1969 | Fed. Rep. of Germany . |
| 2437947 | 7/1977 | Fed. Rep. of Germany . |
| 2749665 | 5/1979 | Fed. Rep. of Germany . |
| 2930162 | 2/1981 | Fed. Rep. of Germany . |
| 2952600 | 7/1981 | Fed. Rep. of Germany . |

OTHER PUBLICATIONS

"New Polyethylene Foams", *Kunststoffe*, vol. 61, 1971, No. 10, pp. 745–749.

*Primary Examiner*—Benjamin R. Fuller
*Attorney, Agent, or Firm*—Antonelli, Terry & Wands

[57] ABSTRACT

A sound-insulated flow duct is provided with walls made up of a composite of an elastic thermoplastic, predominantly closed-cell foam material as the outer layer and an open-cell, elastic soft foam material as the inner layer.

19 Claims, 7 Drawing Figures

SOUND-INSULATED FLOW DUCT AND PROCESS FOR THE MANUFACTURE THEREOF

The invention relates to a sound-insulated flow duct for conveying air or other gases and to a process for the manufacture thereof.

The use of synthetic resins and synthetic foam materials in the fields of indoor and outdoor building acoustics has been known for quite some time; as described, for example, to the periodical "Kunststoffe" (Plastics), Vol. 43, 1953, Issue 11, pp. 446–454, especially page 448. A significant problem is encountered in sound absorption; i.e., the dissipation of acoustic energy, when lowering the sound level in the audible range. Primarily, porous materials are utilized for this purpose, such as fiberboards and rock wool mats. Also, foam materials are conditionally suitable for acoustic purposes; in this connection, in case of porous foam panels, the values for the degree of sound absorption are small at low frequencies and rise somewhat with increasing frequency. In porous sound absorbers, the sound absorption is based on friction of the vibrating air on the walls of the pores. In foam materials having closed cells, absorption is due to internal energy conversion within the layer since the so-called "closed-cell foam materials" normally contain 20 to 30% open cells which, likewise, participate in the absorption, but to a lesser extent than in case of a so-called "open-cell foam material."

DOS (German Unexamined Laid-Open Application) No. 2,609,872, for example, describes an absorption sound insulator for flow ducts wherein the absorption-active element is a flat molded component of closed-cell soft foam, weighted inside with spot-wise arranged masses; i.e., metal balls, this component being located between the flow duct and additional cavities not traversed by the flow. In this arrangement, the flow duct proper is made of sheet metal walls, non-foamed, compact synthetic resin walls, or the like. However, it has been found that closed-cell soft foams do not attain the high sound insulation attainable with open-pore or open-cell foams.

It is not always expedient, and not in all cases possible on account of available space, to shape an absorption sound insulator into a flow duct. Especially in case of flow ducts having a curved portion or in case of flow ducts having variable cross-sections, it is difficult to find a suitable form of absorption-type sound insulator. In order to reduce sound conductance in flow ducts, for example, in intake and exhaust ducts, ventilating ducts in automotive vehicles in air conditioners, etc., a sound-insulated flow duct is proposed according to this invention which is characterized in that the walls are made up of a composite of an elastic thermoplastic, primarily closed-cell foam material as the outer layer or ply and an open-cell, elastic soft foam material as the inner layer or ply. The flow duct constructed according to this invention is self-supporting and dimensionally stable.

The flow duct fashioned, in accordance with this invention, absorbs the noises and sounds transmitted by the flowing air; furthermore, it is of critical importance that no radiating noises due to possible resonance vibrations are produced by the composite material combination of this invention. Also, the flow duct is neutral to sound and the closed-cell foam material of the outer layer has no negative effect on the sound-absorbing action of the inner layer, which negative effect is exerted, for example, by hard compact housing materials.

The outer layer of the primarily closed-cell foam material essentially takes over the task of shaping and providing permanent configuration of the flow duct and avoids radiation of noises in case of possible resonance vibrations. Advantageously, the closed-cell foam material of the outer layer of the composite dampens or absorbs the natural (i.e., resonance) vibrations generated by resonance of the open-cell foam material forming the inner layer. Accordingly, the outer layer acts as a secondary sound absorber. The inner layer of an open-cell soft foam material essentially constitutes a primary sound absorber and acts as a resonance absorber, wherein the acoustic effectiveness of the partially sealed, still air-permeable foam material is due to a superposition of resonance characteristic and energy conversion on account of air friction in the open foam cells within the inner layer.

In a further development of the invention, it is advantageous to provide, for the outer layer, a foam material having a density of 70–200 $kg/m^3$, preferably 100–150 $kg/m^3$ which, even in case of small dimensions, ensures high dimensional stability of the flow duct.

Preferably, a polyurethane soft foam material is utilized as the open-cell soft foam for the inner layer. It will be understood that the term "polyurethane" includes all elastic, soft thermoplastic type; e.g., the polyester or polyether types. However, other elastic open-cell foam materials can, likewise, be employed, for example, as described in European Patent Application No. 0 043 052, or, for example, open-cell plasticized PVC foam materials. The open cell foam material for the inner layer may have a density of about 20 to 60, preferably 20 to 20 $kg/m^3$ in order to exhibit improved sound absorption. The open cells of this foam material have diameters with dimensions that range preferably between 0.1 and 1.2 mm.

Especially suitable for the outer layer are elastic, thermoplastically deformable, primarily closed-cell foam materials, particularly on those basically formed of polyolefins. In this connection, the crosslinked polyolefin foam materials; namely, the polyolefin foam materials crosslinked by electron beams and especially the chemically crosslinked polyolefin foam materials, exhibit special advantages when molded into the flow cross-sections, since they have high dimensional stability and trueness of configuration, and prevent the transmission of natural or resonance vibrations.

The noise-insulated flow duct, according to this invention, can be utilized, in particular, in the areas of conductance of fresh air or temperature-controlled air, for example, downstream of a fan leading to a space having a defined exhaust opening. Depending on the distance to be bridged by the flow duct, the duct can have a linear, curved or angular in its length and can have a constant, flaring or tapering cross-section. In this connection, the flow duct constructed, according to this invention, does not only take over the conductance of the air, but also absorbs the noises transmitted by the fan, for example, to the flowing air. An especially advantageous field of application lies in the automotive vehicle art where such flow ducts, as noise-insulated ventilating ducts, conduct the air from the fan into the interior of the automobile.

Depending on the size of flow duct to be manufactured, foam panels having a thickness of 3–15 mm, preferably 4–10 mm, are utilized for the outer layer, and foam panels having a greater thickness of 5–50 mm, preferably 5–15 mm, are used for the inner layer, and these panels are bonded together by flame laminating, for example, and the composite is shaped by molding the outer layer permanently into the configuration of the flow duct. Depending on the shape of the flow duct, the duct can be formed from two or more and optionally also mutually differently molded components of the foam material composite. The components are then adhesively joined at the junction zones, for example, by welding, cementing, or the like. The desired thickness of the outer layer depends on the desired stability of the product; i.e., dimensions and shape of the product. The thickness of the inner layer depends on the shape and desired sound absorption of the product.

The absorption range of the open-cell soft foam material is also dependent on the thickness of the foam layer; the thicker the foam layer, the more is the absorption range shifted toward the lower frequencies. In order to optimize absorption by resonance effect, the provision is made to seal partially the uncovered surface of the inner layer in a controlled air-permeable fashion; i.e., to retain, by defined sealing, a definite air permeability, for example, with a smooth surface or, according to another proposal of the invention, by profiling, for example, in a rhombic, tetrahedral, nubbed, grooved, or like shape. In these procedures, the controlled air permeability is achieved by providing a surface porosity, as hereinafter defined. In order to optimize absorption by resonance effect, it is important to provide a foam of uniform quality and high cellular porosity, that means cells per area; i.e., many small cells correspond to a high cellular porosity and to a higher degree of absorption. The cellular porosity of a foam is measured indirectly due to measuring the resistance of air flow according to DIN 52 213 (as per Raleigh in $N \cdot sec \cdot m^{-3}$). The measured resistance of air flow is substantially dependent upon the size of the cells and nearly independent of the density of the foam. A preferred open-cell foam material to be used with the invention has a partially sealed air-permeable surface that exhibits an air flow resistance measured on the sealed surface, according to DIN 52 213, of about 30 to 150 $N \cdot sec/m^3$, preferably 40 to 80 $N \cdot sec/m^3$. It is possible by means of the profiling to optimize sound absorption in predetermined frequency ranges. By the texturing of the surface, an increase in the absorption area is obtained, and thus, the sound-absorbing effect is increased. It is, thus, possible at the same time, even with relatively thin layers of the open-cell soft foam ply, to attain satisfactory sound absorption values in the medium and high frequency ranges and/or to achieve optimum absorption in specific frequency ranges. The denser the seal of the surface, the more does the sound absorption shift toward the lower frequencies. Furthermore, the sealing action also provides an improved dirt-repellant surface. A smooth surface sealing can be obtained by melting the foamed surface to a thin compact layer of polyurethane having a thickness of about 10 to 200, preferably 10 to 100 $\mu$m.

In order to raise absorption in the lower and medium frequency ranges; i.e., especially below 2,000 Hz, a resonant effect must be attained in this range; this is possible, for example, by increasing the density of the cells, such as by a more intense sealing of the surface.

By profiling or texturing of the surface of the inner layer, it is possible, according to the invention, to mold the uncovered surface in various ways and, thus, to obtain varying surface densities and/or dense-cell structures of the inner layer. It is possible to achieve a resonant effect in controlled frequency ranges as desired for the flow duct in correspondence with the proportions of the surface areas and/or layer zones of higher and lower densities with respect to each other. This permits optimum sound insulation.

Especially so-called "sealed" or skin-covered polyurethane foam materials, such as, for example, foam panels produced continuously according to the method disclosed in German Patent Application P No. 31 12 883, which corresponds to U.S. Pat. No. 4,364,892, are suitable for sound absorption and for use as the inner layer of the flow duct according to this invention.

One process for the production of a sound-insulating flow duct, according to the present invention, provides that an elastic, thermoplastic foam panel, which is predominantly closed-cell, is adhesively bonded together continuously with an open-cell, elastic soft foam panel over the entire contacting area, for example, by flame laminating; however, bonds with the use of adhesion promoters are also possible, depending on the foam materials selected. Cut-to-size sections are made from the thus-manufactured composite sheet by cutting or punching sections of differing sizes, corresponding to the configuration of the flow duct, and then the cut-to-size sections are heated on the side of the closed-cell foam material; e.g., in an infrared oven, to a temperature adequate for permanent deformation of the elastic thermoplastic, closed-cell foam material of the outer layer alone, but below a temperature causing permanent deformation and collapse of the open-cell foam material, and, thereafter, the different sized sections are press-molded in molds into the desired shape, and/or partial shapes of the flow duct in such a manner that only the closed-cell foam material is permanently deformed and the open-cell foam is not plasticized but is merely shaped to conform to the configuration of the deformed closed-cell foam material. Then the partial shapes are combined to form the flow duct and joined together along the junction zones by adhesion, for example, by welding.

The composite sections are preferably heated to a temperature of 140°–180° C. At this temperature, the thermoplastic, closed-cell foam materials, for example, polyolefins, are already adequately plastic to be permanently deformed in a press-molding process. However, at these temperatures, an open-cell soft foam material, based on polyurethane, is not as yet affected to such an extent that it is subject to permanent deformation; rather, this foam material is elastically restored after cooling. The polyurethane foam material should not be heated higher than 180° C., so that restoration of the open-cell foam material to substantially the original thickness, after cooling is achieved.

it is very important that the open-cell foam material of the inner layer is not subjected to permanent deformation and, in particular, is not compressed since, otherwise, the acoustic effect; i.e., the sound absorption, would be considerably imparied. The foam material chosen for the outer layer must, even after the deformation, exhibit such a stiffness that this foam material will compensate for the restoring elasticity of the inner layer.

One possibility for molding the composite sections into the flow duct is the use of press molds with male and female mold parts.

Another process for producing the noise-insulated flow ducts, according to this invention, resides in making cuts or pieces from primarily closed-cell foam material panels in correspondence with the shape of the flow duct and molding such cuts into the desired shaped section or shaped sections with the use of pressure and heat, for example, by the vacuum forming method; then, cut-to-size portions are made from open-cell foam panels corresponding to the desired shapes and coated on the back with an adhesive, whereupon the adhesive-coated cut-to-size portions are inserted in the corresponding molded sections and are pressed in and bonded by means of pressure, optionally two or more molded sections are composed into a flow duct and joined along the rims by welding or gluing or by mechanical bonding, such as with a clamp. In this procedure, suitable adhesives are utilized, as employed for bonding crosslinked polyolefin foam materials and polyurethane foam materials.

The accompanying drawings illustrate embodiments of the invention wherein.

Figure 1:
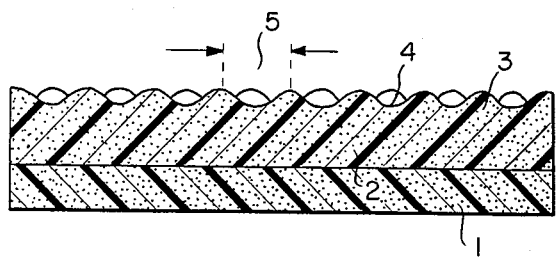
FIG. 1 shows, in a cross-sectional view, the construction of the composite for forming the walls of the flow duct.
Figure 2:
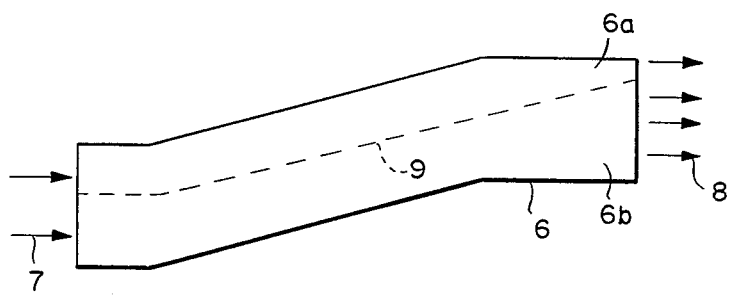
FIG. 2 shows a side elevational view of a flow duct.
Figure 3:
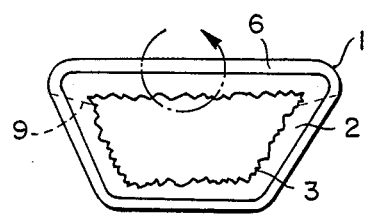
Figure 4:
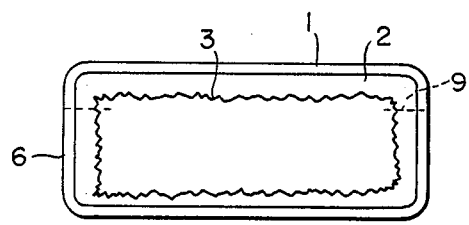
Figure 5:
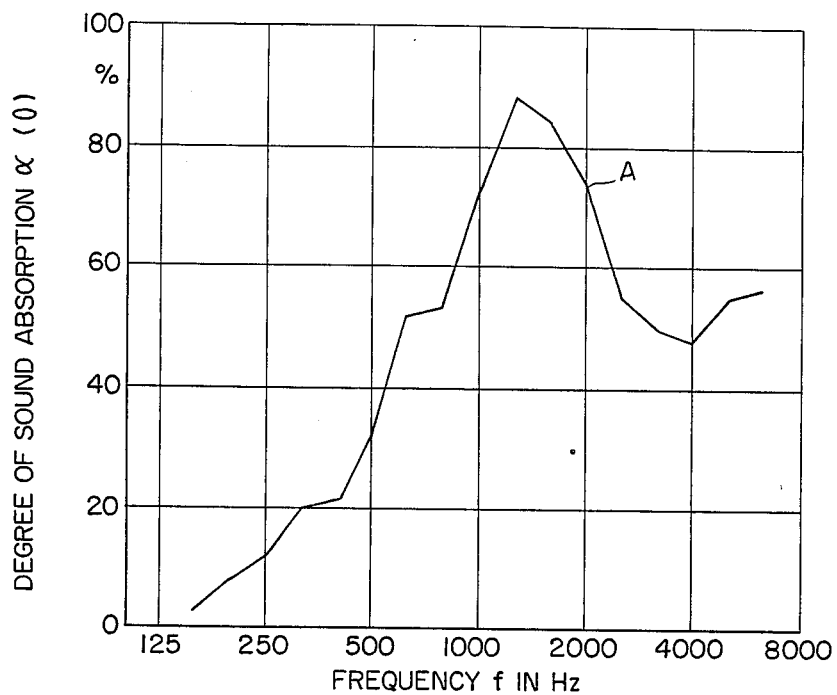
Figure 6:
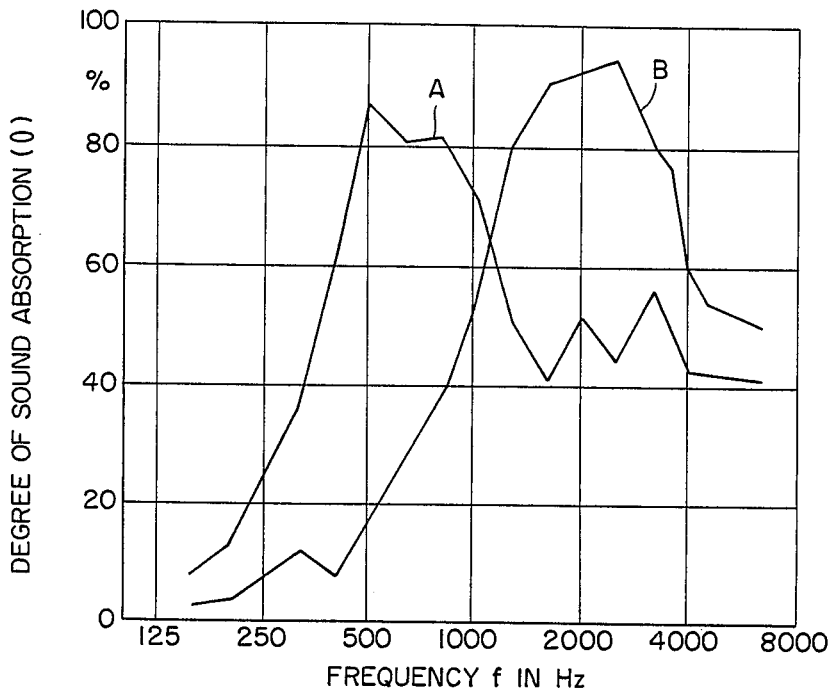
Figure 7:
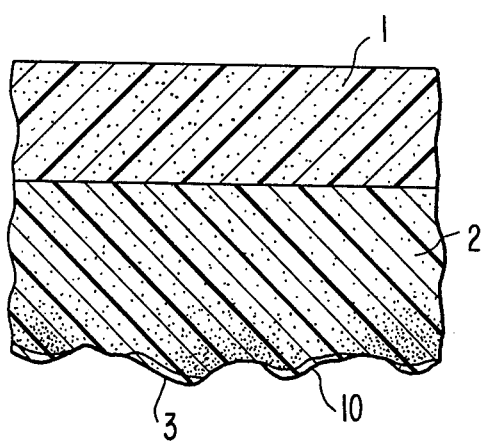

FIGS. 3 and 4, respectively, show the inlet and outlet openings of the flow duct shown in FIG. 2;

FIGS. 5 and 6 are graphical representations of the relationship between the degree of sound absorption of a foam layer at various sound frequencies, and the thickness of the foam; and FIG. 7 is an enlarged cross-sectional view of a portion of the flow duct shown by the encircled arrow in FIG. 3.

The walls of the noise-insulated flow duct, according to this invention, are made up of a composite wherein the outer layer 1 consists of a primarily closed-cell, elastic thermoplastic foam material. The inner layer 2, performing the task of primary sound absorption, consists of an open-cell soft foam material, for example, soft polyurethane foam. The two layers 1 and 2 are bonded together, for example, by flame laminating. It is also possible to bond the layers by means of an adhesion promoter. It is, likewise, feasible in case of very large flow ducts; e.g., having lengths or diameters of a meter or more, to interpose between layers 1 and 2 an additional reinforcing layer, for example, a mat, fabric, or mesh of textile material and/or glass fibers. The inner layer, on the free surface along which the air is conducted, is sealed and, optionally, of a profiled structure in order to increase the sound-absorbing area. This profiled surface 3 can, for example, be nubbed or subdivided in rhombic shape. The depth 4 of profiling will preferably be in the range between 0.5 and 5 mm; the spacing 5 of the crests and/or troughs from each other will be between 5 and 20 mm in all directions. The shape of the surface, whether planar or profiled, depends greatly on the flow rate and the type of noises to be absorbed. This shape can be determined by calculation and/or in appropriate test models. The profiled surface 3 is preferably slightly sealed, but in a way that it still remains air-permeable; in addition, it can be profiled as illustrated.

FIG. 2 shows a flow duct 6 arranged, for example, as a sound-insulating venting duct in an automobile between a fan (not shown) in the zone of the air inlet 7 and the interior of the automobile in the zone of the air outlet 8. The illustrated flow duct 6 exhibits a twice-angled configuration corresponding to the spatial conditions in the automobile and is composed of two half shells 6a, 6b which, however, are of different configurations. The half shells are welded together in the region of the junction seam 9.

In FIG. 3, the inlet opening is illustrated, directly adjoining the fan for the entrance 7 of the air; and FIG. 4 shows the enlarged outlet opening.

In FIG. 7, the inner layer 2 is shown with varying densities by appropriate stippling and the air-permeable skin is designated by reference numeral 10.

Sound-insulated flow ducts of any desired shape can be produced in accordance with the requirements by using the inventive process and construction of a composite material. The preferred frequency ranges for the sound absorption can be determined by the choice of thicknesses for the material as well as by the appropriate surface sealing and optionally profiling. The sound-insulated flow duct, according to this invention, does not require any additional external wrappings, but rather represents a very lightweight component which can be connected without problems.

However, it is also possible to cover the sound-insulated flow duct on the outside with a metal foil or plastic film, or to install the duct within an additional component, depending upon requirements.

FIGS. 5 and 6 show, by way of illustration, the intentional; i.e., controlled, sound absorption attainable with the inner layer 2 only having a suitably fashioned surface, as measured in a Kundt tube. FIG. 6 shows the degree of sound absorption at various frequencies for an open-cell polyurethane soft foam material having a density of 25 kg/m$^3$ with a thickness of the material of 15 mm—curve B—and a thickness of the material of 30 mm—curve A. The surface of the polyurethane soft foam material is sealed, according to the method described in the German Patent Application P No. 31 12 883, in a thickness of the thin sealing coat of about 30 $\mu$m, but is air-permeable in correspondence with the desired and illustrated resonance spectrum to a given extent. It can be seen how the resonance maximum, with increasing foam thickness, is shifted toward lower frequencies, with the surface treatment being the same.

FIG. 5 illustrates the degrees of sound absorption of an open-cell polyurethane soft foam material having an apparent density of 25 kg/m$^3$ with a thickness of the material of 15 mm—curve A. The surface is enlarged by rhombic profiling and simultaneously sealed with a thin coat of the compact melted soft polyurethane or compressed to varying extents by the profiling. The edges of the rhombi are in each case about 8 mm in length; the rhombic have an almost square configuration; the indentations extending between the rhombi and exhibiting greater densification have a width of about 2 mm and a depth of 1.5 mm. It can be seen in a comparison with FIG. 6 how the resonance optimum of curve A in FIG. 6 can be shifted, by the profiling, from the higher frequencies to lower frequencies.

EXAMPLE 1—TESTS FOR SOUND ABSORPTION

A polyurethane foam sheet (of the polyester-type) of 23 kg/m$^3$ density, 25 mm thick, having a cell size (diameter) between 0.6–0.8 mm and being an open cell foam, with no surface treatment, shows a resistance of air flow, according to DIN 52 213, between 305 and 3,400 N·sec/m$^3$. When the sound absorption of this foam sheet is measured in the Kundt tube at 500 Hz, the sound absorption lies between 19% and 43%.

Another sample of the above polyurethane foam sheet was sealed with a thin air permeable skin by melting the foam itself at one surface area, the resulting skin having a thickness of about 20 μm. This material shows a resistance of air flow, according to DIN 52 212, between 50 to 80 N·sec/m³ and the sound absorption measured in the Kundt tube at 500 Hz is about 88%.

EXAMPLE 2—TESTS FOR SOUND LEVEL

A tubular flow duct A consists of an outer layer of rigid PVC with a wall thickness of 1 mm and an inner layer of fine open-cell soft polyurethane foam with cell diameters between 0.5 to 0.8 mm having a thickness of 10 mm, a density of 25 kg/m³ and a sealed inner surface with a thin skin of about 30 μm.

This flow duct A having the construction shown in FIGS. 2-4 has a length of 40 cm, a medium diameter of the inlet of 10 cm and of the outlet of 20 cm.

Flow duct B has same construction and size as flow duct A, and consists of an outer layer of crosslinked polyethylene foam having a density of 130 kg/m³ and a thickness of 5 mm and an inner layer as used in flow duct A.

The quality of sound absorption is measured for both flow ducts A and B by measuring the air volume rate of flow and the resulting sound level (Schallpegel). The following Table 1 shows the resulting sound level of the flow ducts and clearly indicates that the flow duct B, according to the invention, lowers the sound level in a remarkable amount; that is, at the same air volume rate of flow, it is possible to reach a much lower sound level with flow duct B as compared with flow duct A, or in other words, at a higher air flow rate, the flow duct B will achieve the same sound level as achieved by flow duct A at a lower air flow rate.

TABLE 1

| Sound Level | Air Volume Rate of Flow (m³/sec) | |
|---|---|---|
| (dba) | Flow Duct B | Flow Duct A |
| 49 | 6 | |
| 50 | 6.3 | |
| 51 | 6.6 | |
| 52 | 7 | 6 |
| 53 | 7.4 | 6.3 |
| 54 | 7.8 | 6.6 |
| 55 | 8.2 | 7.3 |
| 56 | 8.6 | 7.8 |
| 57 | 9 | 8.1 |
| 58 | 9.5 | 8.5 |
| 59 | 10 | 8.9 |
| 60 | 10.5 | 9.4 |
| 61 | 11 | 9.8 |
| 62 | 11.7 | 10.3 |
| 63 | 12.3 | 10.9 |
| 64 | 13 | 11.4 |
| 65 | 14 | 12 |
| 66 | | 12.8 |
| 67 | | 13.5 |

What is claimed is:

1. A sound-insulated flow duct for conveying gas therethrough which comprises a shape-retaining member having walls to define a gas passage and that are formed from a composite comprising an outer molded layer of an elastic thermoplastic, closed-cell foam material and an inner non-molded layer of an open-cell, elastic soft foam material; said inner layer having an inner surface exposed to the gas passing through said passage and an outer surface bonded to said outer layer; the inner surface of the inner layer being sealed partially with an air permeable-skin so that the inner layer is air-permeable in a controlled manner.

2. A flow duct according to claim 1, wherein the outer layer is formed from a foam material having a density of 70-200 kg/m³.

3. A flow duct according to claim 1, wherein the outer layer is formed from a foam material having a density of 100-150 kg/m³.

4. A flow duct according to claim 1, wherein the outer layer is formed from a crosslinked polyolefin foam material.

5. A flow duct according to claim 4, wherein the inner layer is formed from a polyurethane soft foam material.

6. A flow duct according to claim 1, wherein the shape-retaining member is a preform formed by bonding flat together by flame laminating as the outer layer, a foam panel having a thickness of 3-15 mm, and, for the inner layer, a foam panel having a thickness of 5-50 mm and by shaping the resulting composite preform permanently into the configuration of the flow duct.

7. A flow duct according to claim 1, wherein said member is formed from one or two or more, optionally differently shaped, sections made up of the foam material composite.

8. A flow duct according to claim 1, wherein the inner layer exhibits differing densities.

9. A flow duct according to claim 1 wherein the inner layer is formed from a foam material having a density of 20 to 60 kg/m³.

10. A flow duct according to claim 1, wherein the inner layer is formed from a foam material having open cells of a diameter between 0.1 and 1.2 mm.

11. A flow duct according to claim 1, wherein the inner surface of the inner layer has the air-permeable skin as a thin elastic coat with a thickness between 10 to 200 μm; said elastic thin coat being formed by melting the foam surface of the inner layer.

12. A sound-insulated flow duct for conveying gas therethrough which comprises a shape-retaining member having walls that define a gas passage and that are formed from a composite comprising an outer molded layer of an elastic thermoplastic, closed-cell foam material and an inner non-molded layer of an open-cell, elastic soft foam material; said inner layer having an inner surface exposed to the gas passing through said passage and an outer surface bonded to said outer layer; the inner surface of the inner layer being uncovered and being provided with a profiled configuration in order to optimize sound absorption in predetermined frequency ranges.

13. A flow duct according to claim 12, wherein the outer layer is formed from a crosslinked polyolefin foam material.

14. A flow duct according to claim 13, wherein the inner layer is formed from a polyurethane soft foam material.

15. A sound-insulating flow duct for directing the flow of gas therethrough, which comprises a shape-retaining composite member having a preformed configuration and having inner wall surfaces that define a gas passage for the flow of gas; said composite member comprising an outer layer of an elastic closed-cell foam of crosslinked polyolefin molded to provide said preformed configuration and an inner layer of an open-cell elastic polyurethane foam; said inner layer having inner surfaces providing the inner wall surfaces that define said gas passage and outer surfaces that are bonded to said outer layer to conform to said preformed configuration; said inner layer constituting a primary sound absorber that acts as a resonance absorber and the outer layer constituting a secondary sound absorber that absorbs the resonance generated by vibrations of the open-cell foam forming the inner layer; the inner surfaces of the inner layer being sealed partially with an air-permeable skin so that the inner layer is air-permeable in a controlled manner.

16. A flow duct according to claim 15 wherein the outer layer has a density of 70–200 kg/m$^3$ and the inner layer has a density of 20–60 kg/m$^3$.

17. A flow duct according to claim 15, wherein the inner surfaces of the inner layer have the air-permeable skin as a thin elastic coat with a thickness between 10 to 200 μm; said elastic thin coat being formed by melting the foam surfaces of the inner layer.

18. A flow duct according to claim 15, wherein the shape-retaining composite member is a preform formed by bonding flat together by flame laminating as the outer layer, a foam panel having a thickness 3–15 mm, and, for the inner layer, a foam panel having a thickness of 5–50 mm and by shaping the resulting composite preform permanently into the configuration of the flow duct defining the gas passage therethrough.

19. A flow duct according to claim 15, wherein said shape-retaining composite member having a preform configuration comprises an assembly of at least two preform members each member comprising a closed-cell foam panel adhesively bonded to an open-cell foam panel, said preform members being bonded together along adjacent edges to form said preformed configuration of the shape-retaining composite member.

* * * * *